3,167,864
SPIRIT LEVEL
Edward H. Lange, 930 Meadow Lane, Elgin, Ill.
Filed Sept. 19, 1961, Ser. No. 139,094
4 Claims. (Cl. 33—63)

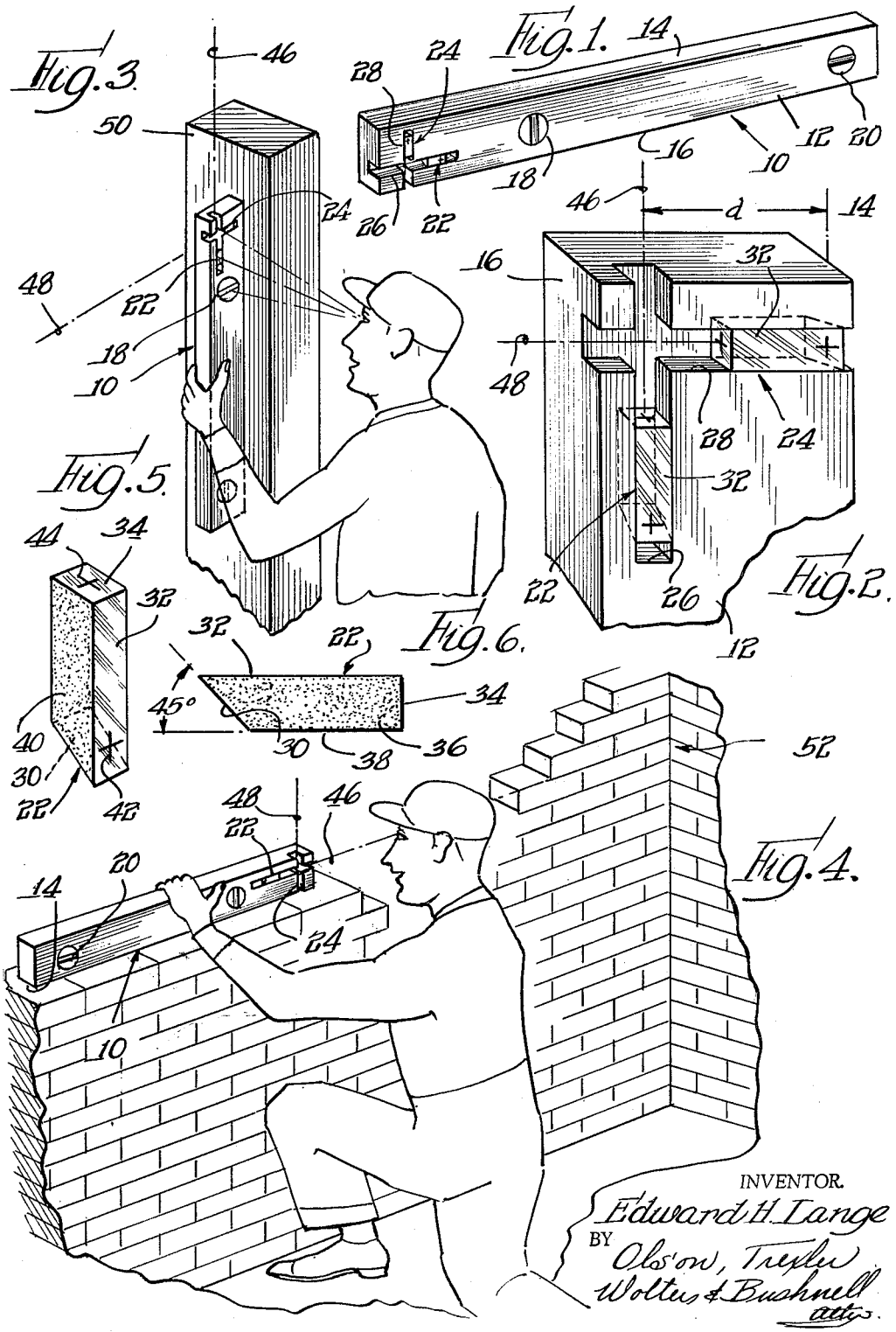

This invention relates generally to spirit levels and especially to a hand-type spirit level incorporating optical means for projecting perpendicular lines of sight.

In the past, optical systems have been combined with hand level devices. However, these optical systems have been arranged to facilitate viewing the level tube or tubes and, as a consequence have not been amenable to use in projecting perpendicular lines of sight from the location of the level device. Accordingly, an important object of the present invention is to provide a hand level device incorporating optical means for projecting lines of sight therefrom.

A more general object of the invention is to provide a new and improved spirit level.

A further object of the invention is to provide a hand-type optical instrument capable of projecting perpendicular lines of sight from either a leveled or plumbed work surface.

Additional objects and features of the invention pertain to the particular structure and arrangements whereby the above objects are attained.

A device in accord with the invention includes a rigid body having a planar surface and right-angularly disposed grooves adjacent the planar surface; a first reflecting prism fixed in one of the grooves and having alignable sight means at the entrance and exit faces for establishing a first line of sight; a second reflecting prism fixed in a different one of the grooves and having alignable sight means at the entrance and exit faces for establishing a second line of sight perpendicular to the first line of sight; level tube means fixed in the rigid body for determining horizontal placement of the planar surface; and plumb tube means fixed to the body for determining vertical placement of the planar surface, the prisms and the tube means being viewable from a single standpoint.

The invention, both to its structure and mode of usage, will be better understood by reference to the following disclosure and drawing forming a part thereof, wherein:

FIG. 1 is a perspective view of a spirit level device constructed in accordance with tenets of the invention;

FIG. 2 is an enlarged perspective view of the end of the level device of FIG. 1 in which the prisms are embedded;

FIG. 3 is a schematic perspective view illustrating use of the invention in plumbing a column;

FIG. 4 is a schematic perspective view illustrating use of the level device of the invention in leveling brick course work;

FIG. 5 is a perspective view of a prism constructed for use in the invention; and FIG. 6 is a side elevational view of the prism of FIG. 5.

Referring now in detail to the drawing, specifically to FIG. 1, a spirit level device indicated generally by the numeral 10 will be seen to comprise a rigid body 12 fashioned in elongated rectangular form and fabricated from a suitable material such as an aluminum alloy or wood. The body 12 is advantageously provided with parallel, planar edge surfaces 14 and 16; and a plumb tube unit 18 is fixed to the body 12 so that the bubble tube arrangement thereof may be utilized in determining the vertical placement of either of the surfaces 14 or 16. Similarly, a level tube unit 20 is fixed to the body 12 so that the bubble tube arrangement thereof may be employed in determining horizontal placement of either of the surfaces 14 or 16.

In accordance with an important feature of the invention, optical means are provided in the level device 10 for projecting lines of sight therefrom; and these optical means advantageously take the form of reflector elements which are oriented to project lines of sight in perpendicular directions. Specifically, these reflectors take the form of reflecting prisms 22 and 24 which are conveniently embedded in intersecting grooves 26 and 28 cut in the body 12 adjacent one end thereof. Optical prisms are preferred to mirrors for the purpose of the invention because it has been found that the silvered reflecting surface of a mirror tends to deteriorate upon exposure to the weather conditions to which the level device 10 is frequently exposed in usage.

Turning for the moment to FIGS. 5 and 6, the prism 22 will be seen to be fashioned in the form of a rectangular bar having one end cut off on an oblique angle. Since the obliquely angled face 30 of prism 22 is intended to act as a reflecting surface, it is advantageously beveled at an angle equal to one-half the desired deviation of the original line of sight impinging upon the prism. Therefore, because it is desired to reflect the line of sight at a right angle relative to its origin, face 30 of the prism 22 is beveled at an angle of 45° as is shown in FIG. 6.

The beveled, reflecting face 30 is polished; and the prism 22 also includes an entrance face 32 and an exit face 34 which are also polished. The remaining sides or bases of the prism, sides 36, 38 and 40 are desirably frosted to prevent spurious rays of light from entering the prism.

For accuracy in establishing the line of sight through the prism 22, cross-hair arrangements 42 and 44 are optically aligned on the entrance face 32 and the exit face 34 respectively. When the prism 22 is fabricated from glass, the cross-hair arrangements may be provided by etching with hydrofluoric acid. When the prism 22 is alternatively fabricated from an optical, resinous plastic such as a cast methyl methacrylate resin, the cross-hair arrangements may be suitably provided by scribing or by scribing in conjunction with painting the scribed groove. It is to be pointed out that dots or other patterns may also be utilized in place of the cross-hair arrangements.

Prism 24 is constructed, fabricated and arranged similarly to prism 22, and like numerals have been employed to designate like features of the two prisms.

Turning to FIG. 2, the groove 28 will be seen to open through the face 16 whereas the groove 26 opens through the adjacent end surface of the body 12. Prism 24 is suitably secured in groove 28, and prism 22 is similarly fixed in groove 26. Appropriate mounting of the prisms 22 and 24 may be achieved with adhesive or set screws, not shown. In compliance with the invention, the prisms are mounted in their respective grooves with the entrance faces 32 exposed at the open sides of the groove. In addition, the prisms are affixed to the body 12 so that the lines of sight defined thereby intersect at a 90° angle. This is best shown in FIG. 2 where prism 22 is illustrated as developing a line of sight 46 and wherein prism 22 is illustrated as developing a line of sight 48 which intersects line of sight 46 at a right angle. Line of sight 48 opens through the planar surface 16. Line of sight 46 opens through the end of the body 12 and is disposed parallel to and spaced apart from planar surface 14 by a distance $d$.

It has proved desirable to provide a tubular metal cap, not shown, to be fitted over the prism end of the level device 10 to protect the prisms when they are not in actual use.

Although the fields of utility for a spirit level device constructed according to the invention are myriad, the principal usefulness has been found in the construction industry. For example and with reference to FIG. 3, the spirit level device 10 may be employed to plumb up a structural column 50 by placing the planar surface 14 against the column and visually determining vertical placement by scrutiny of the plumb tube arrangement 18. While the level device 10 is thus situated in contact with the column 50, a simple shifting of the operator's eye from the plumb tube unit to the prism 24 enables him to project a horizontal line of sight from the column in order to pick a level mark from an adjoining column which, for example, it is desired to match for height. Without moving the level device 10, the operator is able to project a line of sight in a vertical direction by shifting his eye to the prism 22 whereby to align column 50 with an overhead beam spaced above the top of the column. Thus, a level mark can be established on the column 50 while simultaneously aligning the column with an overhead point and plumbing the column for vertical placement.

In somewhat similar fashion, the level device 10 can be employed to great advantage by a brickmason. Referring to FIG. 6, the level device 10 will be seen employed in leveling up a freshly laid course of brick, the device 10 being placed with surface 14 in contact with the fresh-laid course so that level tube 20 may be viewed for purposes of determining horizontal placement of the brick. While the device 10 is thus positioned, the mechanic can shift his eye to prism 22 and his line of sight will be deviated by the prism along the exit line of sight 46, the line of sight 46 picking up the appropriate tier of brickwork in the previously built corner indicated generally at 52. Knowing the separation of line of sight 46 from the face 14, i.e. the distance $d$, the alignment of the freshly laid course of brick with the corresponding tier in the corner 52 may thus be established. Furthermore, the mechanic may shift his gaze to prism 24 and have his line of sight projected along the exit line of sight 48; and with the line of sight appropriately positioned over an edge or over the center of the freshly laid course of brick, the line of sight 48 may be employed in aligning the brickwork with some overhead point, as for example a girder which the brickwork is intended to meet eventually in the course of construction.

As will be recognized, the device 10 can be inverted from its position in FIG. 6 so that line of sight 48 is aimed in a downward direction. Under such circumstances, the line of sight 48 may be employed in vertically truing up a face of the brickwork. This latter disposition of the level device 10 also finds utility in setting marble wall panels, tiled store fronts, glazing and the like.

The spirit level device 10 may also be employed in defining an invisible straight edge of infinite length in order to level a series of objects such as floor or ceiling joists, foundation forms or roof rafters. The level device of the invention may also be used to establish a line from which to jump a dormer or a roof offset. Moreover, the level device of the invention is useful in establishing square lines and determining irregularities in the walls of existing rooms as might be desirable in preparation to installing a kitchen countertop.

It is to be pointed out that the prisms 22 and 24 are intended to be used principally by viewing into the oblique or reflecting face 30 thereof. When the operator's view is thus directed into the prism, the level tube unit and the plumb tube unit are also readily visible to the operator without the need for shifting the instrument or his body. However, the prisms may also be viewed by looking into the exit face 34 thereof; and such viewing has proved useful in establishing the accuracy of the setting of the prisms in the body 12.

The specific example herein shown and described should be considered as illustrative only. Various changes in structure may occur to those skilled in the art; and these changes are to be understood as forming a part of this invention insofar as they fall within the true spirit and scope of the appended claims.

The invention is claimed as follows:

1. An instrument for establishing perpendicular lines of sight, comprising in combination: a rigid body having a side surface, a planar datum edge surface adapted to contact a structural member to be located, and two intersecting edge surfaces substantially perpendicular respectively to said side surface; first optical means supported by said body and including a reflecting prism having an entrance face viewable from said side surface and having an exit face opening through one of said intersecting edge surfaces whereby to establish a first line of sight to a horizontal reference object; second optical means supported by said body at right angles to said first optical means and including a reflecting prism having an entrance face viewable from said side surface and having an exit face opening through the other of said intersecting edge surfaces whereby to establish a second line of sight to a vertical reference object, said second line of sight being perpendicular to said first line of sight; and bubble tube means mounted on said body to be viewable from said side surface and to be disposed with respect to said planar datum edge surface for use in situating said structural member.

2. An instrument according to claim 1 wherein said body includes intersecting grooves opening from said side surface and from said intersecting edge surfaces to house said prisms in flush mounted relationship.

3. An instrument according to claim 1 wherein said bubble tube means includes level tube means and plumb tube means.

4. An instrument according to claim 1 wherein said prisms include alignable sight means at the respective entrance and exit faces thereof.

References Cited in the file of this patent

UNITED STATES PATENTS 1,125,053    Brautigam _____ Jan. 19, 1915

FOREIGN PATENTS 675,334    Great Britain _____ July 19, 1952